July 2, 1935.  R. W. BABSON  2,006,619
AUTOMATIC PARKING METER
Filed April 11, 1931  3 Sheets-Sheet 1
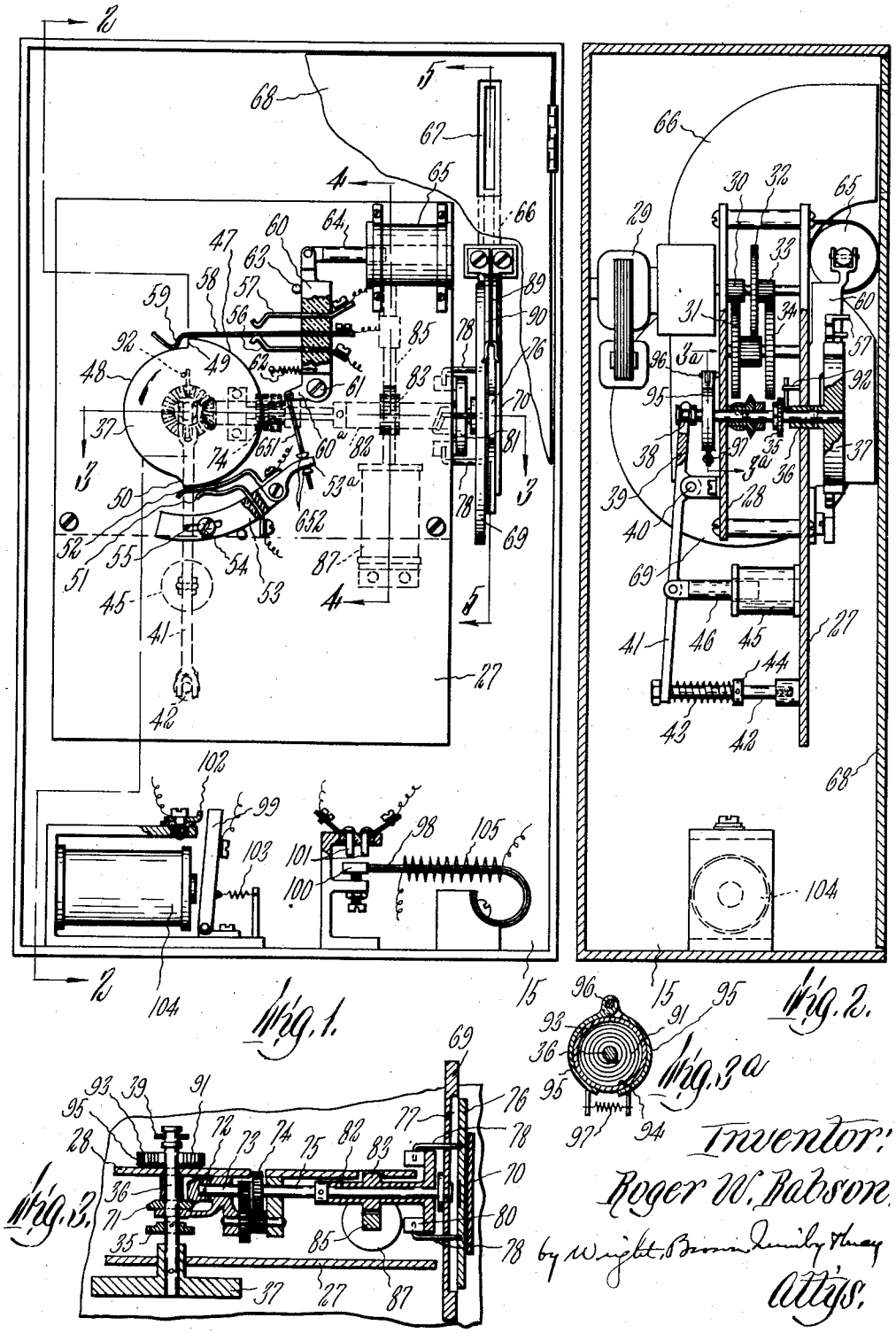
Inventor:
Roger W. Babson
by Wright, Brown, Quinby & May
Attys.

July 2, 1935.  R. W. BABSON  2,006,619
AUTOMATIC PARKING METER
Filed April 11, 1931   3 Sheets-Sheet 2
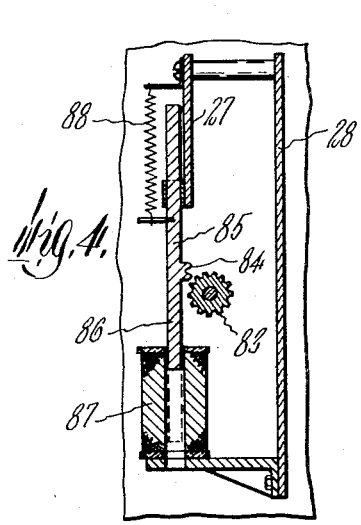
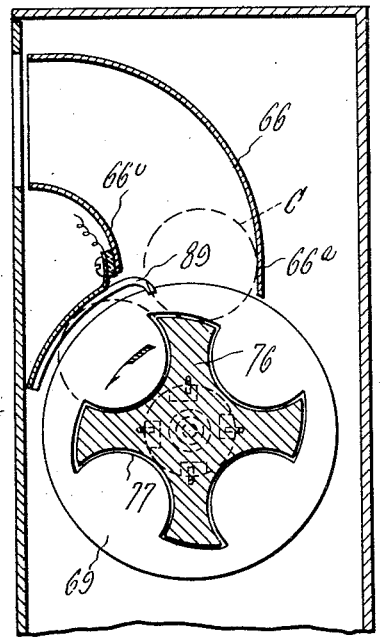
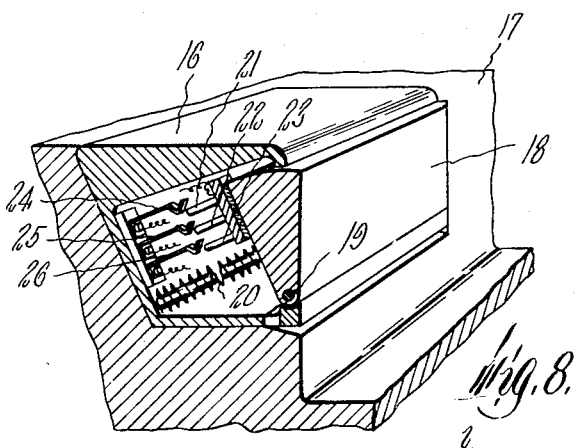
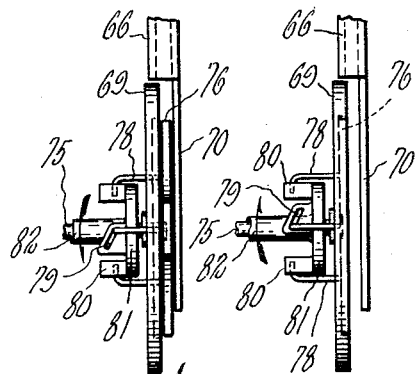
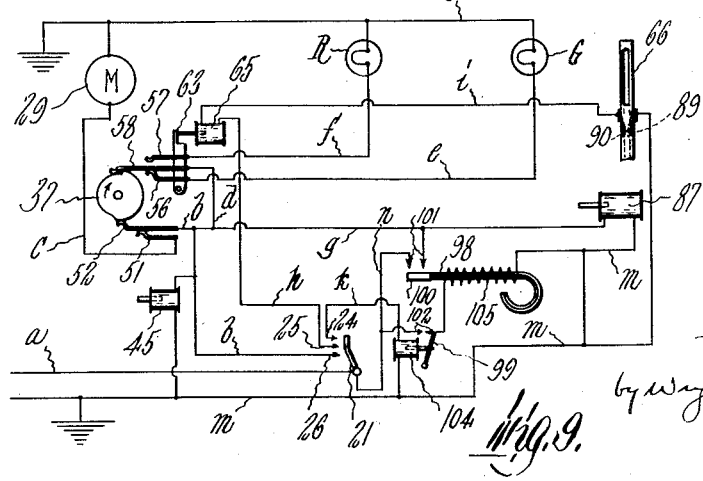
Inventor:
Roger W. Babson,

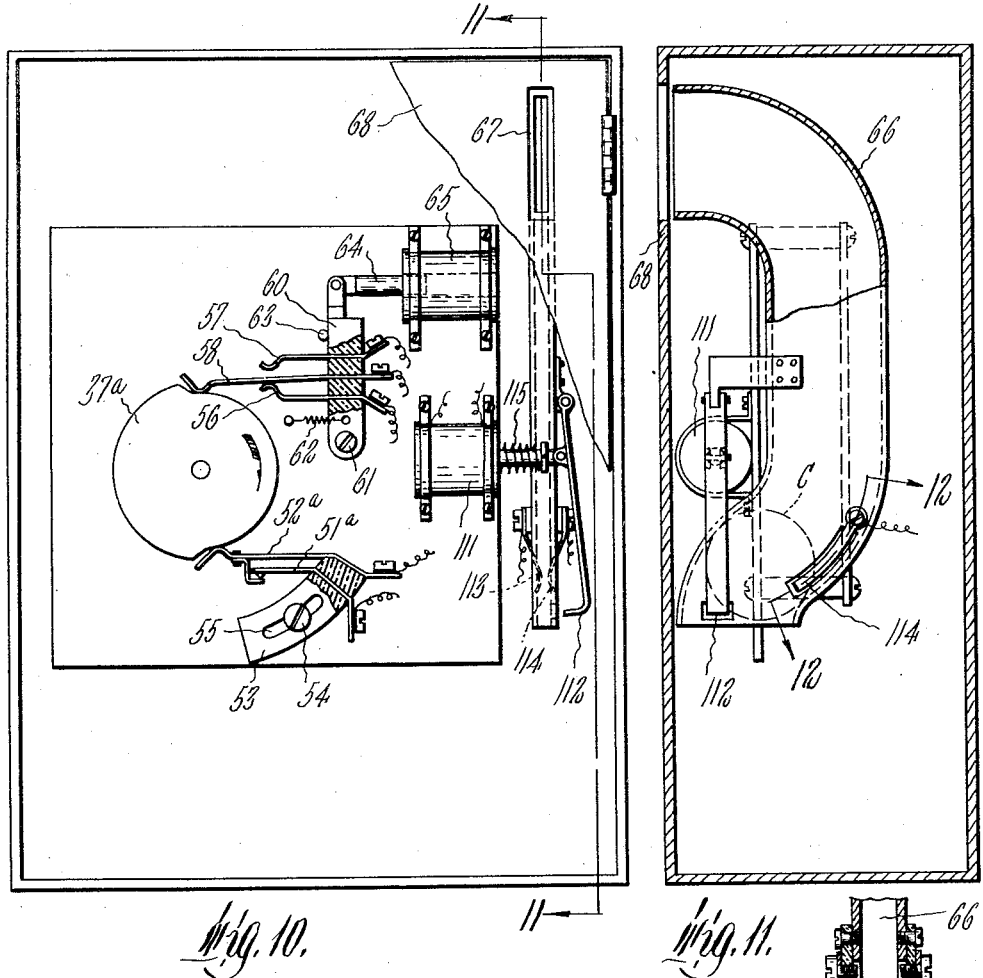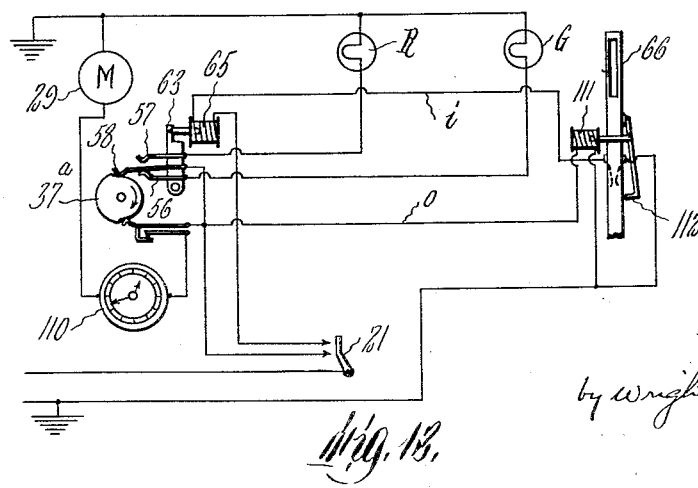

Patented July 2, 1935

2,006,619

UNITED STATES PATENT OFFICE 2,006,619

AUTOMATIC PARKING METER

Roger W. Babson, Wellesley, Mass.

Application April 11, 1931, Serial No. 529,419

21 Claims. (Cl. 194—6)

The present invention relates to apparatus of the general character disclosed in my prior Patent No. 1,731,839, October 15, 1929, and my pending application, Serial No. 420,270, filed January 11, 1930, for controlling the parking of vehicles, particularly automobiles, in public places. It has a similar purpose to that of said pending application, namely, of showing the authorities whether or not a car parked in a public place is properly parked, and to give notice at once to all concerned when the car has been left beyond the limit of time permitted for parking in that location, or when a license to park for a limited time has expired.

It is further related to my pending application, Serial No. 466,421, filed July 8, 1930, having the same fundamental purpose as that one, of causing the signal means to be set in operation automatically by the automobile upon its arrival in the parking location, and of enabling the signal device to be located at any distance from the parked automobile without necessity of any physical connection between the automobile and the signal apparatus. In the main, the invention here disclosed is an embodiment of the same one disclosed in the application last named, but differs therefrom in providing alternative means by which parking limits of different duration are provided for in different localities or zones, and in the provision of new and improved means for handling and disposing of coins, etc. deposited in the machine to secure parking time, and for resetting the controlling or timing element of the machine to starting position upon departure of the car from a parking place.

The present illustration of the invention is presented in two embodiments applicable, respectively, to zones or localities in which different time restrictions as to parking are established. One embodiment is designed for use where a relatively short free parking time is allowed and extensions of time are permitted in consideration for payment made by depositing a coin in the machine. The other embodiment is applicable to zones and localities where free parking is permitted up to a certain hour of the day, and thereafter parking through all or any part of a further period is permitted in return for payment similarly made.

In the drawings,—

Fig. 1 is a front elevation of a machine illustrating the first embodiment, shown as mounted in a box or case having a door which is partly broken away to show the interior;

Fig. 2 is a cross section of the case taken on line 2—2 of Fig. 1, showing the machine therein contained mainly in elevation and partly in section;

Fig. 3 is a horizontal section of part of the machine taken on line 3—3 of Fig. 1;

Fig. 3a is a detail sectional elevation of the returning spring and its anchoring friction clutch;

Figs. 4 and 5 are detail sectional views taken, respectively, on lines 4—4 and 5—5 of Fig. 1;

Figs. 6 and 7 are fragmentary elevations showing the coin handler of the machine with its relatively movable parts in two different positions;

Fig. 8 is a fragmentary perspective view and cross section of a curb switch which forms part of the complete apparatus;

Fig. 9 is a diagram of the electrical parts and connections of the complete apparatus shown in the preceding figures;

Fig. 10 is a view similar to Fig. 1 of the second of the previously referred to embodiments of the invention;

Fig. 11 is a cross section taken on line 11—11 of Fig. 10;

Fig. 12 is a detail section enlarged taken on line 12—12 of Fig. 11;

Fig. 13 is a diagram of the electrical equipment of this latter embodiment, including also the controlling master clock which may be located at a distant station.

Like reference characters designate the same parts in all the figures wherever they occur.

Both forms of apparatus are designed to be used in connection with visible signals, preferably, but not necessarily, in the form of electric lights which are mounted adjacent to parking berths at the side of the street, or elsewhere, in such manner that a set of such signals is identified with each berth. There may be, and preferably are, a green light indicating that the car is properly parked, and a red light to indicate, when illuminated, that the permitted parking time has been exceeded by the car in the corresponding berth. These lights are shown only in the diagram, Fig. 9, at G and R respectively, but practical modes in which such lights, or equivalent signals, may be mounted visibly on a post, or on the wall of a building or other structure adjacent to the parking berth, will be readily apparent to all those skilled in the art without specific illustration. The controlling apparatus or machinery may be assembled in a box 15 of any convenient design or character, which may be placed in any convenient location and connected by electrical conductors with the lamps or other signal devices and with the main switch closable by the automobile when correctly parked. Such a switch is shown in Fig. 8 as a curb-stone switch consisting of a box 16 set into the sidewalk curb 17 and having an upright front wall 18 adapted to turn about a pivot 19 and being normally protruded by a spring 20 where it can be engaged and pressed inward by the nearer wheel of an automobile parked, squarely or diagonally, wheel to curb. Said upright wall 18 may be called for convenience the switch actuator, and may be considered as typical of any device capable of being engaged and moved by some part of a parked automobile so as to close one or more electrical circuits, and to return into open circuit position when disengaged by the automobile. In this embodiment the actuator carries three contact pins or fingers 21, 22 and 23, all connected to one side of an electrical circuit and adapted to be brought into touch, respectively, with complemental contacts 24, 25 and 26, in separate electrical circuits, when displaced from normal position by the parked automobile.

Closing of the circuits controlled by said contacts puts into operation the apparatus contained in the box 15. Such apparatus comprises the following. A frame consisting of a front plate 27, back plate 28 and intermediate connecting members, is mounted in the box. This frame supports a self-starting synchronous electric motor 29 of a well known character, or any other equivalent prime mover capable of being started and stopped by external control and of running at a uniform rate. Such motor drives a speed reducing gearing 30, 31, 32, 33 and 34, the last wheel of which is adapted to be meshed with a pinion 35 on an endwise movable shaft 36 which carries a timing member or element 37. Shaft 36 is coupled by flanking collars with a fork 38 on the arm 39 of a lever which is pivoted at 40 to the frame plate 28. The other arm 41 of this lever is forked to embrace a guide rod 42 fixed to the front plate of the frame and surrounded by a spring 43 which is confined between the arm 41 and an abutment 44, whereby it places and holds shaft 36 uncoupled from the motor, as shown in Fig. 2, except when overcome by superior force. A solenoid 45, having a core 46 which is connected to the lever arm 41, furnishes such superior force when energized and shifts the pinion 35 into mesh with gear 34, thus coupling the timing member with the motor.

The timing member here shown is a circular cam disk having a high dwell 47, a low dwell 48, and shoulders 49 and 50 between them at opposite sides of the center of the cam. This cam or timing disk controls two switches, one of which, consisting of a relatively stationary contact 51 and a relatively movable spring contact 52, controls the circuit of motor 29. When the contact 52 is pressed upon by the high part of the cam, this switch is closed, but when the low part 47 is next to the switch, the contact 52 separates from the complemental contact and opens the circuit. These contacts are mounted on a block or insulating holder 53 which is clamped to plate 27 by a screw passing through a slot 55 in the block, to permit adjustment about the axis of the timing cam, for the purpose of accommodating this switch to substitute cams providing for a longer or shorter period of free parking time. Contact 52 is secured to an arm 53a which is pivoted to holder 53.

The other switch controlled by the timing cam consists of a normally stationary contact 56 in circuit with the signal light G, a second normally stationary contact member 57 in circuit with the signal light R, and an intermediate circuit changing contact member 58 which is itself a spring strip under tension, or otherwise spring actuated, so that it tends to close against the contact 56. It protrudes into proximity to the timing cam, and has a bearing portion 59 on which the cam acts. These three switch members are carried by a holder 60 of insulating material supported on a pivot 61 and normally brought by a spring 62 against a stop 63. In this position of the holder, the high part of cam 37 is adapted to bring the movable arm 58 against contact 57, while its low part permits the arm to return or to remain in contact with 56. This holder is connected with the core 64 of a solenoid 65 which, when energized, is adapted to withdraw the switch arm 58 from the cam and allow it to close the circuit with 56.

The switch carrying holder 60 and arm 53 are coupled together by a link 651 in such manner that, when the holder 60 is tilted to withdraw the switch arm 58 from the high part of the cam, the switch contact 52, which at that time has been permitted by the low part of the cam to spring away from contact 51, will be again closed against the latter contact. In order to accomplish these results in all of the adjusted positions of the holder 53, link 651 is preferably made as a screw threaded rod pivoted at one end to an arm 60a of the holder 60 and passing through a slot in an arm 53a of holder 53, which arm is flanked by abutment nuts 652 screw threaded on the link.

At one side of the machine assemblage last described is a coin chute 66, the entrance to which registers with a slot 67 in the door 68 of the box. One of the side walls of this chute is in the same plane with a circular disk 69 and terminates adjacent to the upper side of the circumference thereof. The opposite side wall of the chute extends to a considerable distance across the face of the disk at a distance therefrom wide enough to admit a coin of prescribed dimensions, forming a guard 70 to retain the coins in engagement with the disk. Such disk is rotated in a fixed ratio to the speed of the timing member 37, by a bevel gear 71 splined to shaft 36, a bevel gear 72 in mesh with 71, a shaft 73, speed reducing gearing 74, and a shaft 75 to which the disk is secured, all as plainly shown in Fig. 3. The shaft sections 73 and 75, and the gearing associated therewith, are supported by bearings secured to the frame.

A star wheel 76 having spaces between its arms suited to receive coins of a given diameter, is associated with the disk 69 and is adapted to enter and merge from a correspondingly shaped recess 77 in the face of the disk. When withdrawn into such recess, its outer side is substantially flush with the face of the disk, or at least it protrudes so slightly that it has no ability to prevent coins from falling through the chute. This star wheel has axially extending fingers 78 which pass through holes in the disk (in which they fit slidingly) and extend onward to engagement, by means of their inwardly bent ends, with inclined cam slots 79 formed in lugs 80 or an equivalent flange protruding from a head 81 which is secured to a sleeve 82 rotatably surrounding shaft 75. Said fingers and grooves are one embodiment of a cam or wedge device which, upon rotation of sleeve 82 relatively to shaft 75 in the direction of the arrow of Fig. 6, causes the star wheel to project from the disk, and by relative rotation in the direction of the arrow shown in Fig. 7, causes the star wheel to be withdrawn into the complemental recess or pocket in the face of disk 69. The particular cam device here shown is intended to be typical of all equivalent alternatives which may be applied for the same purpose.

Sleeve 82 carries a gear pinion or segment 83 operable by teeth 84 on an endwise movable bar 85 which is part of, or connected to, the core 86 of a solenoid 87 and is withdrawn from the solenoid, when the latter is inactive, by a spring 88, as shown best in Fig. 4. The teeth 84 are so limited in number that they are out of engagement with the pinion 83 when the bar 85 is at either end of its movement, and the gear couple 83, 84 is otherwise so proportioned that when the teeth 84 are moved by the solenoid they cause protrusion of the star wheel 76, as shown in Fig. 6, and when oppositely moved by the spring 88 they cause withdrawal of the star wheel, as shown by Fig. 7. Thus, except when actually being moved by either the solenoid or spring, the teeth 84 leave the disk and star wheel free to be rotated in unison by shaft 75.

The star wheel 76 is so related to the coin chute as to arrest an inserted coin in substantially the position shown by broken lines at C except when one of the pockets registers with the chute outlet, and the end faces of the star wheel arms are so inclined as to cause such an arrested coin to roll back against the outer boundary 66a of the chute; this in order to prevent operation of the coin controlled part of the apparatus by any coin smaller than the one for which it is designed. Two separated contact pieces 89 and 90 are secured to the inner curved wall of the chute, but insulated therefrom, as shown by Fig. 5, and extend side by side approximately concentric with the star wheel but projecting into the chute far enough to overlap the rim of a coin in the position C. These contact pieces embrace the peripheral part only of a coin of large enough diameter, and are near enough together, and otherwise formed, to be both engaged by the same coin from the time it reaches the position C in Fig. 5 until it is carried beyond them by continued rotation of the star wheel. These contact members are in circuit with the solenoid 65.

After withdrawal of a parked car, return of the timing member to starting or zero position is necessary, for which reason the timing member is made disconnectible from the driving motor, as previously described, a spring 91 is provided for rotating it backward, and stop members 92 are provided for arresting it at zero position. One of such stop members is secured stationary to the frame plate 27, and the other projects from shaft 36 in a position to clear the first stop when the shaft is moved endwise into coupled connection with the driving motor, but to strike the stop when shifted to the uncoupled location shown in Fig. 2. Inasmuch as the timing member may be turned through any angle between a few degrees up to more than a complete revolution, or even several revolutions, it is necessary to mount the returning spring in such a manner that it will permit any degree of rotation of the timing member without being overwound, notwithstanding that the return of this member to zero position always involves less than a complete revolution, due to the position of the stop.

In satisfaction of this requirement, the spring is made as a flat spiral coiled around the shaft 36 and made fast thereto at its inner end. Its outer end is anchored frictionally, not positively, to the frame plate 28. Such anchorage in the present illustration is comprised by a cylindrical drum 93, in which the spring is confined and to which its outer end is secured by a hook 94; and a gripper in the nature of brake shoes 95, connected to the frame by a pivot 96, embracing the drum and pressed against its outer surface by a spring 97. By suitable design and adjustment of said gripper shoes and their spring, the returning spring 91 is held with sufficient firmness to enable it to return the timing member 37 and the coin propelling disk 69, which is permanently geared to the timing disk, back to their zero positions. Nevertheless the spring holding drum is enabled to slip in the grippers when movement of the timing member continues after the spring has been wound up to a predetermined degree. Thus the spring is neither overwound nor overstrained, nor does it impose any positive limit to the extent of rotation which can be given to the timing member at will.

Further elements of the apparatus are a thermostatic switch 98 in an alternative circuit for supplying current to the lights, etc., and a relay switch 99 in the heater circuit of the thermostatic switch. These switches may be contained in the same box with the apparatus previously described, or in any other convenient location. The thermal switch comprises a bimetallic bar adapted to be flexed back and forth with changes of temperature, carrying a contact 100 which is thus movable into and out of bridging connection with two separated and insulated contacts 101 in the supply circuit. The relay switch is provided in order to avoid destructive sparking of the main switch contacts when the circuit carrying the heavy heating current is broken. It comprises an arm to which one terminal of a circuit is connected adapted to close against and separate from a complemental contact 102. It is normally held away from the latter contact by a spring 103 and is brought into circuit closing position by an electro-magnet 104 when the latter is energized.

This relay switch is in circuit with an electric heater 105 which delivers heat to the bimetallic bar 98.

The electrical connections are shown in the diagram Fig. 9, in connection with representations of the parts previously described, to which the reference characters previously used have been applied. a represents a conductor for bringing current to the apparatus from any suitable source of supply, ordinarily the electric lighting and power supply of the community in which the apparatus is installed. This conductor leads to the member 21, and its branches 22 and 23, of the curb-stone switch. From the complemental contact 26 a conductor b leads to one member of the motor controlling switch 51, 52, from the other member of which a conductor c leads to the motor. A branch d from the conductor b leads to the circuit closing and changing contact arm 58 of the signals; and a conductor e leads from the complemental contact 56 to the signal G, while a conductor f leads from the contact 57 to the signal R. Another conductor g branches from b and leads to the solenoid 87.

A conductor h leads from the second contact 25 of the main switch to the solenoid 65 by which the signal switch is shifted; a conductor i leads from the other terminal of solenoid winding 65 to one of the separated contacts, as 90, of the coin control switch; and a conductor *j* leads from the other contact, as 89, of this switch, to the return line, or ground. The third contact 24 of the main switch is coupled by a conductor *k* with the magnet 104 of the relay switch 99. All of the appliances thus supplied are connected at their return or low potential sides with ground or a return line typified by the conductors shown at *l* and *m*.

The manner in which the apparatus operates is as follows. It will be assumed that the described apparatus is designed for use where free parking for half an hour is allowed, and that thereafter a further period of parking for one hour will be permitted upon payment of twenty-five cents (or any other prescribed amount of money); with further extensions of an hour each for further payment of like sums. On this basis the timing member 37 is arranged to start from the position shown in Fig. 1 and rotate in the direction of the arrow at the rate of one revolution per hour. The coin carrying disk is organized to retain the coin in circuit closing engagement with the contacts 89 and 90 for one hour from the time it drops into a rising pocket until it falls out of the pocket with further rotation of the latter. As illustrated, the disk is therefore provided with four coin pockets, rotates at one-fourth the angular speed of the timing disk, and travels ninety degrees in transferring any pocket from coin receiving to dumping position.

When an automobile runs into the parking berth and closes the curb-stone switch, current flows through the motor 29, starting it, energizes the solenoid 45 and thereby causes the timing disk shaft to be coupled to the motor and set into rotation; flows through the signal G by way of the closed switch contacts 58, 56; actuates solenoid 87, thereby turning sleeve 82 so as to project the star wheel element 76 of the coin receiving disk, closes the relay switch 99, and then flows through the heating coil 105 of the thermostatic switch, whereby the contact 100 closes the circuit across the contacts 101. The signal G being illuminated, shows that the car is correctly parked and has not overstayed the time limit. At the end of half an hour, rotation of the cam has brought it into reversed position, whereby the switch 51, 52 is opened, which stops the motor, and the switch arm 58 is shifted from contact 56 to contact 57, putting out the light G and turning on the light R, which shows to all concerned that the car has overstayed the free parking time; that is, if the owner has not anticipated an overstay by depositing a coin of the proper denomination.

When a coin is inserted into the chute, it bridges the gap between contacts 89 and 90, causing the solenoid 65 to be energized, which pulls back the holder 60 and allows the switch arm 58 to return, by its spring force or by gravity, into touch with contact 56, returning signal G to action and disabling signal R. At the same time the arm 53a pivoted on holder 53 is tilted by its connection with holder 60, causing the switch contact 52, if then separated from contact 51, to be closed against it, whereby the motor is started. If the car remains parked thereafter for more than the time required to complete the revolution of the cam, the high part of the latter, coming again into engagement with contact 52, merely slides over the already closed switch Cooperation of spring 62, stop 63, rigid link 651, and abutment 652, normally holds the arm 53a firmly in place when no coin is deposited, so that contact 52 is able to spring away from 51 as permitted by the cam.

If the motorist anticipates leaving the car for more than the free period, he can deposit the coin before leaving, whereupon the green light will continue to show for an hour and a half, and the motor will not cease running in that time, unless the car leaves sooner. Before the star wheel arrives in position to receive the coin in its uppermost pocket, it holds the coin on the end of one of its arms ready to fall into the pocket, and in circuit closing position, as shown at C in Fig. 5. Upon dumping the coin from the star disk the signal is returned to the red light and the motor is stopped. This action may be repeated by depositing coins from time to time, or by originally inserting a number of coins sufficient to pay for whatever parking time the driver desires to purchase.

Upon withdrawing the car from the berth, the main switch automatically opens, and, if the thermostatic switch were not provided, all of the circuits and electrical devices would become dead, no matter at what time it occurs and whether a coin is in the chute or not. Thereupon the signal light would be extinguished, the star wheel 76 retracted into its pocket in the disk 69 (by the operation of rack bar 85 under the pull of spring 88) whereby any coin supported by the star wheel would be immediately released and dropped, the timing member uncoupled from the motor by action of spring 43, and this disk and the coin disk restored to starting position by the spring 91.

The reason for providing the thermostatic switch 98 is to delay the effect due to withdrawal of the car for an appreciable period in order that a motorist may not fraudulently obtain an extension of free parking time by moving his car away from the curb and returning it, without first giving another driver an opportunity to occupy the same space. Hence the thermostatic switch is interposed in a circuit *n* which leads directly from the supply line to the signal controlling switch 58 and to the coupler controlling solenoid 45. However, the relay switch controlling the current flow to the heater 105 is opened as soon as the car moves away and the heat responsive element of the thermostatic switch then begins to cool off. The cooling time is so regulated that the active signal is not turned off, and the timing means is not returned to starting position, until after lapse of time ordinarily sufficient to permit the occupant of a parking berth to remove his car from it and a new comer to put his car in. But as soon as the heated element cools off and breaks the circuit at 101, the electrical equipment becomes dead and the timing member is returned to starting position. It will be noted that the relay switch 102 and heating coil 105 are in a shunt circuit from the conductor *n*, whereby current flow to the heating coil does not pass through any of the contacts of the main or curb-stone switch.

The other illustrated form of the invention is designed for use in zones or localities where cars are allowed to park free for a stated part of the day, say all the forenoon up to 12:30 noon, or any other period when parking space is not in great demand, but payment is demanded for use of the space after the prescribed limit. The modification of equipment for that purpose contains many of the same parts, functioning in the same way as those first described, but is different in other particulars. The signals controlling switch therefor, and motor for the timing member are the same. However, the timing member 37a may be permanently coupled to the motor and geared to rotate at a slower rate, say once in twelve hours, or other given time period; and it is designed to shift the signal changing switch from G to R immediately after it starts, but not to open the motor controlling switch 51a, 52a until after the end of the time, following the free parking period, during which further parking is permitted for a stated sum.

A master switch 110 is connected in the motor circuit, and operated so as to close a break in the circuit between the motor and switch 51a at the stated hour. Such master switch may be a time switch for a single parking station, located at the station, or an automatic time switch or manually controlled switch located at a central station and in parallel connection with the motor circuits of all the parking signals in the zone. The circuit for the signal lights may be opened and closed by the same, or an equivalent, master switch; or the current for the signals may be in condition to flow as soon as the automobile presses the curb-stone switch. In any event, the effect of closing the master switch is to start up the motor and cause the red signal R to show in connection with any parking berth then occupied by a car unless the car owner has previously deposited a coin.

When the car closes the curb-stone switch, it causes current to flow through a conductor o to a solenoid 111 which draws a spring retracted gate 112 to cross the chute 66 in position to arrest the coin deposited therein. The coin placed in the chute is stopped by the gate in the position shown at C in Fig. 11, wherein it extends between contact springs 113 and 114, in contact with both, and closes circuit i which operates solenoid 65 and brings the signal changing switch into position to show the green light, for as long as the car stays in the berth, or until the current supply is shut off at the power house or other control station. Opening of the main switch by withdrawal of the car or shutting off of the current otherwise, de-energizes solenoid 111 and allows the gate to be opened by its spring 115, releasing the coin which then falls out of the chute.

It will be understood that the solenoids herein shown and described are equivalent to other forms of electromagnetic motors and typify any motive elements capable of being used for the purposes which they serve. Hence the term "electro-magnet" has been used herein with generic significance to designate any such device. It will also be understood that red and green signal lights have been selected as the indicating means of this apparatus on account of their convenience and because their colors are generally understood as having conventional meanings analogous to those which the respective signals convey in the foregoing description. However, a wide variety of other signal devices, whether illuminated or not, may be used equivalently to the specific ones described. In many other respects also variations from the specific disclosure may be made within the scope of this invention and the protection which I seek, as set forth in the appended claims.

It is to be understood that the foregoing description of purpose and use of the invention is not to be taken as a limitation of the scope of protection which I claim. On the contrary, I claim the essentials of all novel principles, combinations and mechanisms herein disclosed, for all uses to which they may be put.

What I claim and desire to secure by Letters Patent is:

1. A parking signal apparatus comprising means operable by a parked vehicle for setting in motion a timing apparatus, a signal device, a timing apparatus having means for actuating said signal after a predetermined period, and coin controlled means for preventing the actuation of the signal thereby.

2. A signal device for showing overtime of a parked automobile comprising the combination of a signal member, a main actuator therefor controllable by a parked automobile, a timing means, a secondary actuator for said signal device controllable by said timing means, and coin controlled means for removing said secondary actuator from the influence of said timing means.

3. A signal apparatus for showing overtime of parked vehicles comprising an electric signal, a main switch and secondary switch in series circuit with said signal, said main switch being closable by a parked vehicle and the secondary switch being normally open, a timing member movable at a prescribed rate of speed having means for closing the secondary switch, electromagnetic means adapted when energized to remove the secondary switch from the influence of said timing means, a coin receiver, and a circuit closer operable by a deposited coin for energizing said electromagnetic means.

4. A parking indicator comprising a plurality of different signals in parallel electric circuits, a two-way switch normally in closed circuit relation with one of said signals and adapted to be shifted into open circuit relation thereto and closed circuit relation with the other signal, a timing member movable at a constant rate of speed and having means for shifting said switch from the first to the second relation at a given point in its movement, a control switch for said timing member arranged to be operated thereby at the same time to stop the motion of the timing member, a main switch controlled by the parked vehicle for putting the aforesaid elements into action, and coin controlled means for restoring or maintaining the first condition of said two-way switch and for continuing the motion of said timing means.

5. A parking indicator comprising a plurality of different signals in parallel electric circuits, a two-way switch normally in closed circuit relation with one of said signals and adapted to be shifted into open circuit relation thereto and closed circuit relation with the other signal, a timing member movable at a constant rate of speed and having means for shifting said switch from the first to the second relation at a given point in its movement, a control switch for said timing member arranged to be operated thereby at the same time to stop the motion of the timing member, a main switch controlled by the parked vehicle for putting the aforesaid elements into action, a coin receiver, electrical means operated by a coin placed in said receiver for restoring or continuing the first named condition of the two-way switch and for continuing the motion of said timing member, and means operable in connection with the movement of said timing member for displacing the received coin from its operative position, whereby to arrest the timing means with the two-way switch in its second named condition.

6. A signal apparatus for showing over time of parked vehicles, comprising a main electrical switch closable by a vehicle occupying a parking berth and normally open when the berth is unoccupied, a self-starting electric motor in circuit with said switch, a motor-controlling switch interposed in said circuit, an electric signal also in circuit with the main switch, a signal controlling switch interposed in the latter circuit, a timing member movable by the motor adapted when in one position to cause the motor controlling switch to be closed and the signal controlling switch to be opened, and in another position to cause opening of the motor controlling switch and closing of the signal controlling switch, a switch closable by a deposited coin in series circuit with the main switch, an electromagnetic apparatus in circuit with said coin controlled switch and operable when the latter is closed by a coin for opening the signal circuit independently of said timing means, a movable coin receiver and displacer adapted to hold the deposited coin in closing relation to the coin controlled switch and displace the coin out of such closing relation, and propelling means for the coin receiver actuated by said motor.

7. An apparatus as claimed in claim 6, comprising further means controlled by the main switch and operable upon opening thereof for discharging immediately a coin held by said receiver.

8. An apparatus as set forth in claim 6, in which the coin receiver is provided with retractable coin supporting means combined with an actuator for said supporting means operable by closing of the main switch to place said means in coin supporting position, and by opening of the main switch to retract the supporting means and permit immediate dislodgment of a coin supported thereby from circuit closing position.

9. A signal apparatus as claimed in claim 6, comprising further automatic means for restoring the timing member and coin receiver to starting position upon opening of the main switch.

10. In an apparatus of the character described, a signal closing switch comprising a relatively movable contact and relatively stationary contact, a movable timing member engageable with said movable contact and adapted to shift the latter into engagement with the fixed contact, a holder on which the members of said switch are mounted, and means for shifting the holder so as to place the movable contact into and out of the influence of said timing member.

11. An apparatus as claimed in claim 10, comprising a main switch operable by a parked automobile, circuits controlled by said main switch, an electric motor for driving the timing member included in one of said circuits, the said signal switch being in another of said circuits, an electromagnetic means in still another of said circuits, a normally open switch adapted to be closed by a deposited coin in the last named circuit, and means for causing displacement of such a coin from its switch closing position.

12. In an apparatus as claimed in claim 10, a coin controlled electrical actuator for said holder, a carrier for the coins deposited to control said actuator, said carrier comprising a disk, a star wheel having coin supporting boundaries adapted to be projected from the disk and retracted into a recess in the face thereof, oscillatable cam means for so retracting and projecting said star wheel, and means controlled by the parked vehicle for projecting the star wheel when parked and retracting the star wheel when the vehicle has left the parking berth.

13. In an apparatus of the character described, the combination of a motor, a signal controlling member driven by said motor, a coin receiver, connections between said motor and coin receiver for driving the latter at a rate in definite proportion to the rate of driven movement of said signal controlling member, and means operable by a parked vehicle for putting said motor into operation.

14. An apparatus as claimed in claim 13, comprising further means for returning said signal controlling member and coin receiver to starting position when the vehicle has left the parking berth.

15. An apparatus as claimed in claim 13 including a switch closable by a parked vehicle, electrical means operable by closing of said switch for starting the motor and coupling the signal controlling member and coin receiver therewith, and mechanical means for uncoupling said member and coin receiver and returning them to starting position, when said main switch is opened.

16. A metering apparatus comprising an electrically operated signal, a self starting electric motor, main circuit closing means for simultaneously opening and closing the circuits of both the signal and motor, a secondary switch in each of said circuits, timing means driven by the motor for causing operation of both secondary switches, and coin controlled means for reversing the condition of the secondary switches imposed by said timing means.

17. In an apparatus of the character described, the combination of an electric motor, a switch in the circuit of said motor organized to open the circuit automatically unless overcome by superior force, a motor driven cam acting upon said switch, constructed to close the switch when in one position and permit opening of the switch when in another position, and coin controlled means for holding the switch in closed position regardless of the position of said cam.

18. A metering apparatus of the character described, comprising a self starting electric motor, a normally closed switch in the current supply circuit of said motor, a normally open switch adapted to be closed for initially starting the motor, timing means driven by the motor for causing the normally closed switch to be opened after a given time so as to stop the motor, and electromagnetic means operable by a deposited coin for shifting said switch so as to close it after having been so opened, or to prevent its initial opening.

19. An apparatus of the character described, comprising an electric signal, an electric motor, switches located in the supply circuits of the signal and motor respectively, timing means driven by the motor for controlling said switches and adapted to cause shifting of the signal switch and opening of the motor circuit switch after a period of running, an electro-magnetic device connected mechanically with said switches and operable, when energized, to shift them out of the influence of said timing means, and coin controlled means for energizing said electro-magnetic device.

20. A parking indicator comprising a plurality of different signals, a two-way switch for controlling said signals being normally in operative relation with one of the signals but adapted to be shifted into operative relation with the other signal while putting the first signal out of operation, a timing member movable at a constant rate of speed and having means for shifting said switch from the first to the second relation at a given point in its movement, a main switch actuated by the parked vehicle for putting the aforesaid elements into action, and coin controlled means for restoring the first condition of said two-way switch or preventing the shifting of said switch by the timing member.

21. In an apparatus of the character described, an electric motor, a switch in the controlling circuit of the motor comprising complemental contacts, one of which normally tends to separate from the other, means independent of said switch for starting the motor, a timing member driven by the motor and having such form and position that it holds the separable switch contact against the other during part of its motor driven movement and during another part of its movement leaves the separable contact free to separate from the other contact, and coin controlled means connected to said separable contact and operable by an inserted coin to place the separable contact against the other contact while the separable contact is free from the restraint of the timing member.

ROGER W. BABSON.